United States Patent [19]

Bayer

[11] Patent Number: 5,068,637

[45] Date of Patent: Nov. 26, 1991

[54] PLATE-LIKE METAL ELEMENT FOR ELECTRICAL RESISTOR GRID ASSEMBLY

[75] Inventor: Eric W. Bayer, North East, Pa.

[73] Assignee: General Electric Company, Erie, Pa.

[21] Appl. No.: 476,856

[22] Filed: Feb. 8, 1990

[51] Int. Cl.$^5$ .................. H01C 1/08; H01C 3/00; H01C 7/22; H01C 1/01

[52] U.S. Cl. .................................. 338/57; 338/58; 338/277; 338/281; 338/295; 338/315

[58] Field of Search ................ 338/57, 58, 277-295, 338/316, 315

[56] References Cited

U.S. PATENT DOCUMENTS

| | | | |
|---|---|---|---|
| 2,858,402 | 8/1958 | Griffes et al. | 201/69 |
| 3,212,045 | 10/1965 | Weyenberg | 338/316 |
| 3,543,213 | 11/1970 | Weyenberg | 338/295 X |
| 3,550,058 | 12/1970 | Du Bois | 338/57 |
| 4,316,172 | 6/1982 | Luy | 338/280 |
| 4,651,125 | 3/1987 | Harkness | 338/295 |
| 4,654,627 | 3/1987 | Harkness | 338/319 |

Primary Examiner—Marvin M. Lateef
Attorney, Agent, or Firm—R. Thomas Payne

[57] ABSTRACT

For use in a welded resistor grid assembly having a plurality of generally parallel, relatively think plate-like metal elements disposed between a pair of spaced-apart insulating support members having a plurality of slotted openings in their opposing sidewalls, a metal element having a substantially rectangular plate-like body of predetermined width, a coplanar flat segment of the same width at one end of the body, a laterally offset flat segment of the same width at the opposite end of the body, the upraised side of the later segment having a flat surface adapted to be joined by a seam weld to the flat surface of the other side of the coplanar segment of another duplicate element after two such elements are placed side by side with opposite orientation so that the offset flat segment of one adjoins the coplanar flat segment of the other, and a border segment of the same width contiguous and generally coplanar with a first one of the flat segments, the border segment being adapted to enter a slotted opening in the sidewall of one of the support members of the assembly. The border segment is characterized by a plurality of protrusions, one of which forms a physical stop against which the distal end of the second flat segment of another duplicate element can abut. A triad of additional protuberances, each adapted to enter a correspondingly dimensrtioned area of the slotted opening, is arranged to center the border segment in the slotted opening when a plurality of duplicate elements are welded and installed in the register grid assembly.

33 Claims, 4 Drawing Sheets

PLATE-LIKE METAL ELEMENT FOR ELECTRICAL RESISTOR GRID ASSEMBLY

BACKGROUND OF THE INVENTION

This invention relates to electrical resistor grid assemblies incorporating a plurality of forced-ventilated, welded metal plates and used in the dynamic braking or retarding function of large electric motors such as the direct-current traction motors on diesel-electric locomotives.

During dynamic braking of a locomotive, its traction motors operate in a generating mode and supply current to heavy duty resistor grids where the electrical energy is converted to heat and dissipated to the atmosphere with the aid of an associated cooling fan. The current-conducting elements of such a resistor grid are supported in a frame of insulating material having suitable dielectric and flexural strength and having a sufficiently high thermal rating to withstand the heat produced in the grid. Typical insulating material for the frame of a resistor grid assembly comprises glass fiber-filled polyester resin that was cured under pressure in a heated mold. Because there are practical limits to the thermal ratings of affordable thermosetting molding compounds, a conventional goal of resistor grid designers is to minimize the amount of heat that will transfer (by conduction, radiation, and/or convection) from the grid to the frame. Toward this end, it is common practice to space the relatively hot parts of the current-conducting elements from the insulating frame members by means of small clips, studs, or the like. The resulting free air space alongside the interior surfaces of the frame inhibit the transfer of heat from the hot elements to the insulating members, and it also allows these surfaces to be more effectively cooled by the air that is blown through the grids.

Representative prior art welded plate resistor grid assemblies are disclosed in U.S. Pat. Nos. 2,858,402, 3,550,058, and 4,654,627. In the assembly or "stack" disclosed in U.S. Pat. No. 2,858,402, each current-conducting element is a die struck strip of sheet metal having right and left-hand offset flat end portions or tangs. Adjacent strips are oppositely oriented so that the right-offset tang of one converges with the left-offset tang of the other. These mating tangs are united by soldering or welding and are inserted in a slot of an insulating support member.

In the assembly disclosed in U.S. Pat. No. 4,654,627, each current-conducting element is a metal plate having oppositely offset planar ends each of which has two narrow, integral, concave projections extending outwardly in a longitudinal direction therefrom. When a first one of the offset ends of each plate is welded to the other offset end of an adjacent, oppositely oriented plate, the two projections of the first end respectively mate with the two projections of the other end of the adjacent plate to form a pair of generally cylindrical mounting legs which are respectively inserted in a corresponding pair of blind holes in an associated insulating support member. The aforesaid legs are long enough to "bottom out" in the holes that respectively receive them, thereby positioning the offset ends of adjacent welded plates away from the support member.

So long as its manufacturing process is carefully controlled, the resistor grid assembly disclosed in the above-mentioned U.S. Pat. No. 4,654,627 has proven satisfactory. Good quality control practices are required to obtain the requisite alignment and mating of the narrow, concave projections, to keep each pair of mating projections from spreading apart during the welding process, and to avoid external burrs or sharp edges that might bite into the bottom or side of the cooperating hole and therefore interfere with uniform bending of adjacent plates during thermal excursions. Such quality measures (including relatively frequent maintenance and resharpening of the tooling used to form the mounting legs) have an adverse effect on the manufacturing cost of the plates used in the assembly. Furthermore, inserting all of the separate mounting legs into their respective cooperating holes during the process of installing the welded resistor grid in the frame of this prior art assembly has been undesirably difficult and time consuming. Another shortcoming of this assembly is that the diameter of each hole in the insulating support members needs to match the outside diameter of each cylindrical mounting leg which in turn is a function of the thickness or gauge of the metal plates, whereby different frames are required for resistor grids of different current ratings.

Adjacent plates of the assembly disclosed in U.S. Pat. No. 4,654,627 are joined together by seam welds. Heretofore such seam welds have been obtained by a rapid-fire, multiple-spot resistance welding process. The adjoining offset ends of the pair of plates to be welded are temporarily clamped together, and this workpiece is advanced transversely in a series of short, incremental steps through the resistance welder. In each step, the workpiece pauses while it is clamped between the welder electrodes to which a pulse of electrical current is then applied. The resulting seam weld actually comprises a chain of overlapping spot welds. This process is inherently slow and is sensitive to variations in both the surface and the internal resistance of the workpiece. Consequently, careful preparation and control are required to ensure uniformly good spot welds in the chain of such welds forming the seam weld.

SUMMARY OF THE INVENTION

A general objective of the present invention is to provide improved plate-like electroconductive elements for use in a welded resistor grid assembly, which elements are relatively simple and inexpensive to make and to assemble.

Another objective of the invention is to provide plate-like electroconductive elements that do not have the shortcomings of the prior art.

A more specific objective is to provide plate-like electroconductive elements that do not have partial-width mounting legs projecting outwardly in a longitudinal direction from opposite ends of each element.

A further objective is to provide a pair of adjacent, plate-like electroconductive elements that are joined together by a seam weld characterized by relatively low electrical resistance, whereby the temperature rise in the vicinity of the welded joint is moderated when these two elements are installed in a resistor grid assembly and are serially conducting electrical current.

In carrying out the invention in one form, each one of a plurality of relatively thin, plate-like metal elements in a welded resistor grid assembly comprises a substantially rectangular body with a pair of integral, full-width flat segments at opposite ends thereof. One of the flat segments of each element is offset from but generally parallel to the plane of the other flat segment of the same element, whereas the latter segment is coplanar with the body. The upraised flat surface of the offset segment is adapted to be bonded by welding to a cooperating flat surface on the other side of an adjoining coplanar segment of another duplicate element after two such elements are placed side by side with opposite lengthwise orientation. Each element further comprises an integral, full-width border segment contiguous and generally coplanar with a first one of the flat segments (e.g., the coplanar segment). The border segment is adapted to enter any one of an array of slotted openings in an associated support member of electrical insulating material, which member is part of the frame of the resistor grid assembly. The frame includes two spaced-apart support members having such slotted openings in their opposing sidewalls, and the aforesaid plurality of metal elements are disposed in generally parallel relationship with one another between these insulating support members. The border segments of alternate elements in the assembly are respectively receivable by the slotted openings in a first one of the two support members, whereas the border segments of the oppositely oriented elements between the alternate elements are respectively receivable by the slotted openings in the other support member.

In one aspect of the invention, the border segment of each plate-like metal element has a centrally located protuberance that projects above a surface continuous with the aforesaid flat surface of the contiguous flat segment of the same element. This protuberance forms a physical stop against which the distal end of the adjoining flat segment (e.g., the offset segment) of a duplicate element can abut to locate the latter element in a desired lengthwise position when two such elements are placed side by side with opposite orientation for the purpose of welding the coplanar segment of one to the offset segment of the other. The desired position ensures that only the border segments of the respective elements enter the slotted openings in the support members when the elements are welded and installed in the resistor grid assembly.

In another aspect of the invention, each of the slotted openings in the opposing sidewalls of the aforesaid support members is characterized by a relatively narrow rectilinear slot having at least three areas where the gap between opposite sides of the opening is appreciably greater than the gauge of the metal element, and the border segment of each element has at least three separate, transversely aligned protuberances. Two of these protuberance are located outboard with respect to the third one and project above the surface of the border segment on one side thereof, whereas the third protuberance projects above the surface on the other side of the same segment. These three protuberances are adapted to enter, respectively, the aforesaid three areas of the slotted opening that receives the border segment when the elements are welded and installed in the resistor grid assembly, and they serve to center the border segment between the sides of the slotted opening. Preferably, each of these three separate protuberances is a semi-spherically shaped bulge. In yet another aspect of the invention, the adjoining segments of a pair of adjacent, oppositely oriented plate-like metal elements are joined together by means of a seam weld characterized by a "zig-zag" joint which was obtained by a wobble beam laser welding process. Such a process desirably increases the effective cross-sectional area of the resultant joint between adjacent elements. The larger the cross-sectional area, the lower the electrical resistance of the joint. Accordingly, less heat will be generated at this joint when it is conducting electrical current during dynamic braking operation.

The present invention will be better understood and its various objectives and advantages will be more fully appreciated from the following description taken in conjunction with the accompanying drawings.

DETAILED DESCRIPTION

Figure 1:
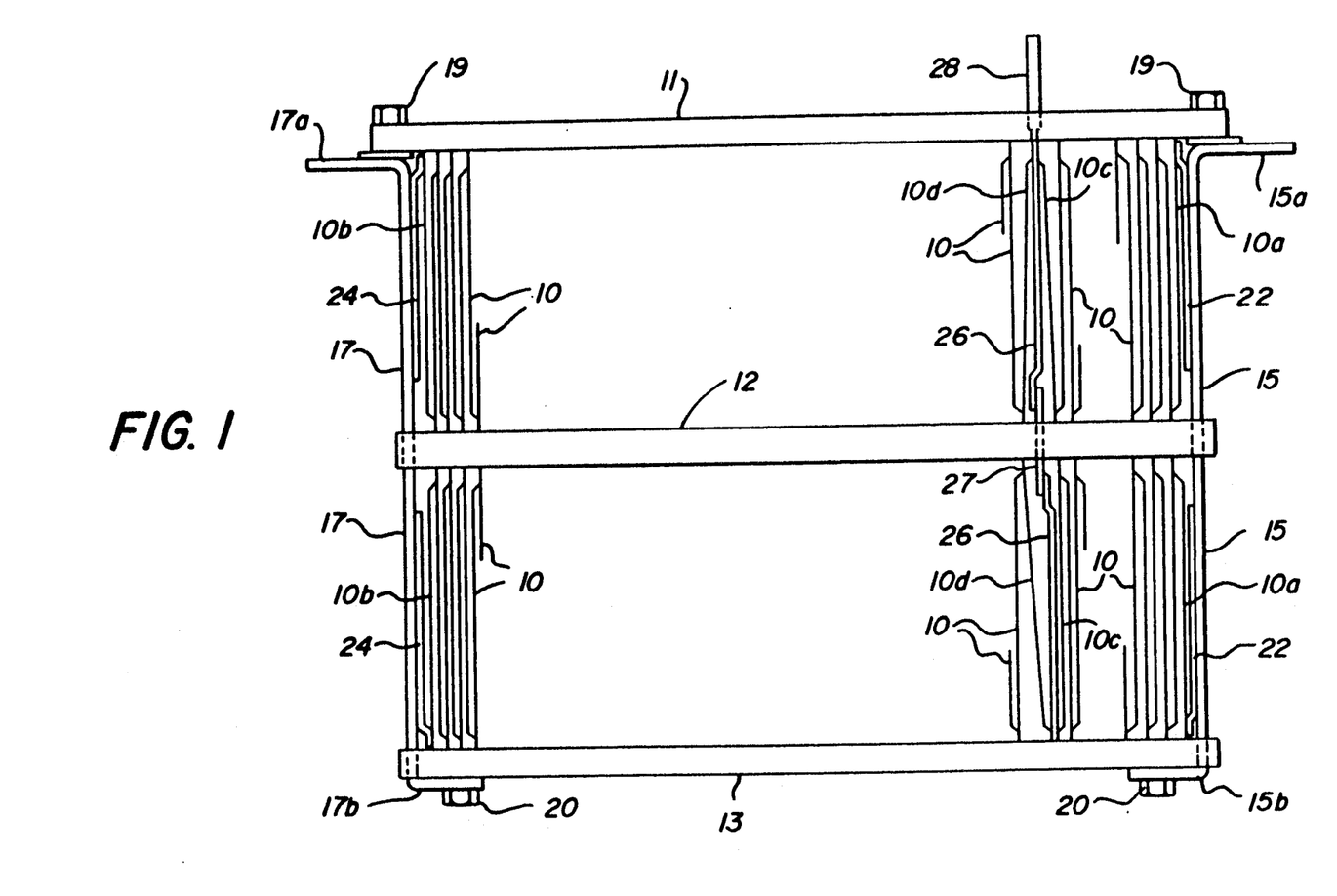
FIG. 1 is a side elevation of a welded resistor grid assembly that includes a plurality of duplicate, plate-like electroconductive elements constructed in accordance with the present invention.

FIG. 1 shows a welded resistor grid assembly comprising a plurality of thin, plate-like resistance heating elements 10 of electrically conductive material mounted in an insulating frame. The frame comprises three elongated, vertically spaced apart support members 11, 12, and 13 of electrically non-conductive material having the required thermal ratings and physical strength. Each support member can be, for example, the same as or equivalent to the high-temperature laminated insulating member disclosed and claimed in my U.S. Pat. No. 4,698,277.

As is shown in FIG. 1, the top and bottom support members 11 and 13 are in turn supported by a pair of vertical members 15 and 17 at opposite ends of the resistor grid. These vertical frame members are metal bars (e.g., stainless steel). Opposite ends of the top support member 11 are respectively fastened to the bars 15 and 17 by means of bolts 19 that engage the threads of tapped holes in outwardly-extending horizontal arms 15a and 17a of these two bars. Opposite ends of the bottom support member 13 are respectively fastened to inwardly-extending feet 15b and 17b of the bars 15 and 17 by means of bolts 20 engaging the threads of internally tapped metal inserts (not shown) that are molded into the member 13. The frame includes two additional members (not shown) of electrically non-conductive material bolted to the out-board vertical sides of the bars 15 and 17, respectively, thereby forming insulating end plates for the assembly. Midway between the top and bottom support members 11 and 13, the vertical bars 15 and 17 respectively pass through cutouts or slots in opposite ends of the center support member 12, and in order to hold the latter member in its illustrated position each of its opposite ends will interlock with a pair of cooperating notches in the edges of the midsection of the associated one of the two end plates.

The electroconductive elements 10 of the resistor grid assembly are arranged in two groups or tiers that are substantially mirror images of each other. In a typical assembly there are more than 100 elements per tier. The elements in the upper tier are disposed between the first or top support member 11 and the second or center support member 12 in generally parallel relationship with one another and at substantially uniform intervals, whereas the elements in the lower tier are disposed between the third or bottom support member 13 and the center member 12 in generally parallel relationship with one another and at substantially uniform intervals. All of the elements 10 are clones or duplicates of each other, and FIG. 1 has been simplified by not showing most of them.

As will soon be more fully explained, each of the duplicate elements 10 is asymmetrical, being bent near one end to form a first flat segment that is offset from but generally parallel to the plane of a second flat segment near the opposite end of the same element. As is illustrated in FIG. 1, adjacent elements in each tier are oppositely oriented. The first, offset segment of each element converges with the second segment of the next element to which it is bonded by a welding process, thereby forming a continuous serpentine or sinuous path for electrical current between opposite ends of the tier. In other words, all of the elements 10 in a tier are serially interconnected, and current will traverse each one in the same relative direction (either from first to second segment, or vice versa). In practice the resistor grid assembly will be installed in an air passageway (not shown) so that cooling air can be blown through the gaps between adjacent elements.

The second segment of the outboard element 10a at the right-hand end of each tier of elements is welded to an offset end of a thicker metal plate 22 that served as a "lead in" connector. In the illustrated embodiment of the invention, the lead in connectors 22 of both tiers are contiguous with the vertical frame member 15 to which they are respectively welded. Similarly, the second segment of the outboard element 10b at the left-hand end of each tier is welded to an offset end of a thicker metal plate 24 that serves as another "lead in" connector, and the connectors 24 of both tiers are contiguous with the other vertical frame member 17 to which they are respectively welded. As a result, the lower tier of elements 10 is electrically connected in parallel relationship with the upper tier between the frame members 15 and 17. If desired, the two tiers could alternatively by electrically connected in series with each other. In either event, the arms 15a and 17a of the members 15 and 17 are adapted to be connected to an external electrical circuit, thereby serving as the electrical end terminals of the resistor grid. In some applications the external circuit will include at least one additional resistor grid assembly. Typically, the illustrated assembly and its component parts are selected and suitably dimensioned for connection to a circuit that will normally supply the resistor grid with direct current having a maximum magnitude of approximately 1,000 amperes.

Figure 2:
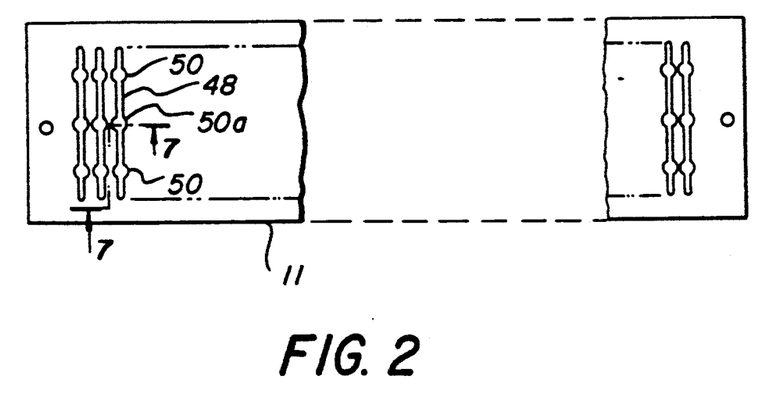
FIG. 2 is a plan view of the slotted face of one of the horizontal, insulating support members in the frame of the FIG. 1 assembly.

For the purpose of maintaining the elements 10 in each tier in their desired uniformly spaced relationship, opposing sidewalls of the horizontal frame members 11, 12 and 13 are each provided with a parallel array of slotted openings. Such openings in the underside of the top support member 11 are illustrated in FIG. 2 which is hereinafter described. In the upper tier, the welded electroconductive elements 10 are aligned, respectively, with the slotted openings in the first and second horizontal support members 11 and 12. The aforesaid opposite ends (i.e., the ends adjoining the second segments) of alternate elements of this tier are respectively inserted in the openings in the underside of the top support member 11, whereas the corresponding ends of the oppositely oriented elements between such alternate elements are respectively inserted in the openings in the topside of the center support member 12. Similarly, in the lower tier, the welded electroconductive elements 10 are aligned, respectively, with the slotted openings in the second and third horizontal support members 12 and 13. The aforesaid opposite ends of alternate elements of this tier are respectively inserted in the openings in the topside of the bottom support member 13, whereas the corresponding ends of the oppositely oriented elements between such alternate elements are respectively inserted in the openings in the underside of the center member 12.

In practice, means for electrically tapping the resistor grid assembly between its end terminals 15a and 17a is often desired. An example of such means is shown in FIG. 1. Between the outboard elements 10a and 10b of each tier, a preselected pair of consecutive electroconductive elements 10c and 10d are oriented in longitudinal agreement with each other, their respective second segments being in proximity to the center support member 12 but with their respective first segments facing each other as shown. The first, offset segments of the selected pair of elements 10c, 10d are respectively welded to opposite sides of a thicker, elongated metal plate 26 located in between this pair of elements. The intermediate plates 26 of both tiers extend toward the center support member 12 and are interconnected by edge welding to a common plate 27. The interconnecting plate 27 passes through a hole or aperture in the center member 12, which aperture registers with an associated pair of slotted openings in opposite sides of the member 12. The upper end of the intermediate plate 26 in the upper tier of elements 10 is butt welded to a vertical bar or terminal 28 of the same material as the end terminals 15a and 17a. The terminal 28 passes through a cooperating aperture that is provided in the top support member 11 midway between a pair of adjacent slotted openings in the same member. As a result of this tap arrangement, there is a net loss of one in the number of slotted openings actually used in the top support member 11. As was hereinbefore explained, the lower tier of elements is the mirror image of the upper tier, and therefore one of the slotted openings in the bottom support member (e.g., the opening immediately to the left of the one occupied by the intermediate plate 26, as viewed in FIG. 1) is not used.

In normal operation, with electrical current of maximum magnitude in the resistor grid for a certain length of time and with cooling air being forced at its rated rate through all of the gaps between adjacent elements of the assembly, the total resistance of the current path between the two end terminals 15a and 17a causes a predetermined amount of electrical power loss in the grid.

This power loss generates an equivalent amount of heat which is dissipated to the atmosphere with the aid of the associated cooling air system. Normally the temperature of the electroconductive elements 10 in the grid will rise to a certain permissible average level (e.g., approximately 500° C.), while the temperature at the hottest spot could climb to a predetermined maximum limit (e.g., approximately 650° C.) which should not be exceeded. In accordance with the present invention, the individual elements 10 of the grid are constructed and arranged to inhibit the transfer of such heat to their respective support members 11, 12 and 13.

Figure 3:
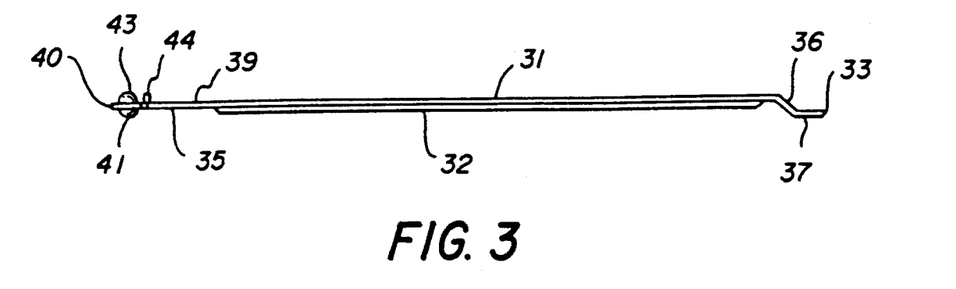
FIGS. 3 and 4 are edge and plan views, respectively, of the presently preferred embodiment of one of the duplicate plate-lilke elements used in the FIG. 1 assembly.
Figure 4:
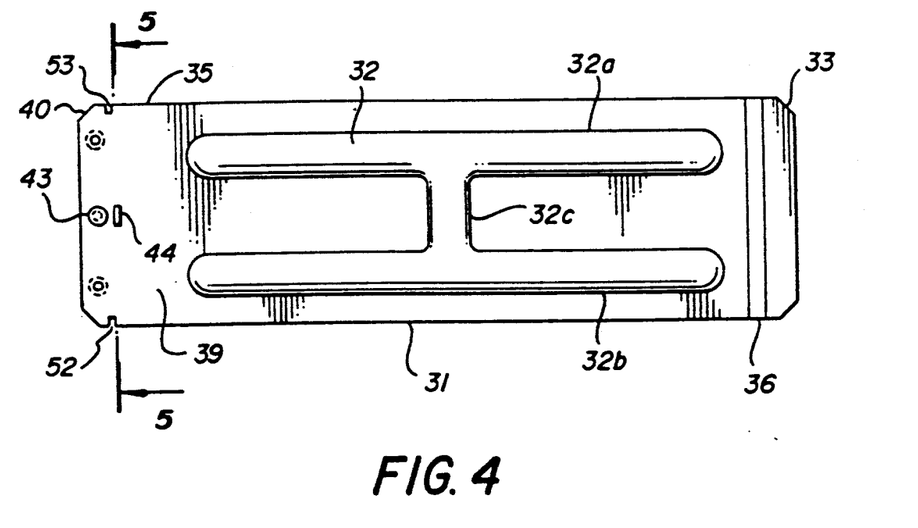
Figure 5:
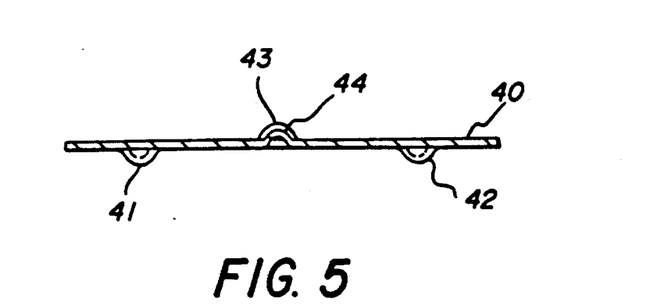
FIG. 5 is a larger-scale sectional view of the border segment of the element, taken through section lines 5—5 of FIG. 4.

The improved electroconductive element 10 of the present invention is best shown in FIGS. 3, 4, and 5 and will now be described. It comprises a relatively thin (e.g., 0.022-inch gauge), substantially rectangular, plate-like metal body 31 having a predetermined width (e.g., approximately 3.1 inches). A portion of the body 31 is upraised to form a corrugation or rib 32 that helps to stiffen the element and that also will produce desirable turbulence in the cooling air flowing through the gaps between adjacent elements in the assembly. Preferably, as can be seen in FIG. 4, the rib 32 has first and second long, parallel sections 32a and 32b extending longitudinally in the body and interconnected by at least one short, transverse section 32c.

At one end of the body 31 there is a first flat segment 33 which is integral with and has substantially the same width as the body. At the opposite end of the body 31 there is a second flat segment 35 which also is integral with and has substantially the same width as the body. In the illustrated embodiment, the second segment 35 is coplanar with the body 31. The element 10 is bent at the juncture 36 of the first flat segment 33 and the body 31 so that the flat surface 37 of the upraised side of the first segment (i.e. the underside of the first segment as viewed in FIG. 3) is in a plane generally parallel to and overlying the corresponding side of the second flat segment 35. The flat surface 39 of the other side of the second segment (i.e., the topside as viewed in FIG. 3) is adapted to be welded to the flat surface (37) of the first segment (33) of another duplicate element after two such elements are placed side-by-side with opposite orientation so that the second segment of one adjoints the first segment of the other.

Contiguous and generally coplanar with the second flat segment 35 of the improved element is a border segment 40. The border segment 40 has substantially the same width and gauge as the second segment, and it is adapted to enter a slotted opening in the sidewall of one of the insulating support members 11, 12, and 13 of the resistor grid assembly. A plurality of protuberances are formed in the border segment. Three separate, transversely aligned protuberances 41, 42, and 43 are semispherically shaped bulges or bosses each formed by depressing the opposite site of the border segment. The first and second bosses 41 and 42 of this triad are outboard with respect to the third boss 43 and project a predetermined distance (e.g., approximately 0.11 inch) above the surface of the underside of the border segment 40, whereas the third boss 43, which is located on the longitudinal centerline of the element halfway between the outboard bosses, projects the same distance above the surface of the topside of this segment. The last-mentioned surface is continuous with the flat surface 39 of the second segment 35 of the element. A fourth protuberance or salient lip 44 in the border segment 40 also projects above the surface of the topside of this segment on the longitudinal centerline of the element. It can be formed by punching the opposite side of the border segment. Preferably, as is indicated in FIGS. 4 and 5, a relatively narrow, short transverse strip of the border segment is lanced to form the lip 44. The third boss 43 is located between the lip 44 and the distal end of the border segment 40.

Figure 6:
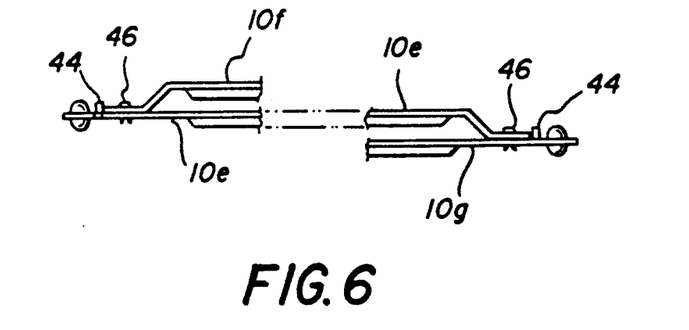
FIG. 6 is an edge view of opposite end portions of two pairs of adjacent plate-like elements that have been bonded to one another by welding.

The lip 44 in the border segment 40 forms a physical stop against which the distal end of the first segment (33) of another duplicate element can abut to locate the adjacent element in a desired lengthwise position when two such elements are placed side-by-side with opposite orientation for the purpose of welding the flat surface 39 of the second segment of one to the flat surface 37 of the adjoining first segment of the other. This is best illustrated in FIG. 6 which is an edge view of parts of two pairs of adjacent elements that have been interconnected by means of seam welds 46. The lip 44 in the border segment of a first electroconductive element 10e is abutted by the distal end of the first, offset segment of a second, oppositely oriented electroconductive element 10f that is adjacent to one side of the first element, and the distal end of the first, offset segment of the first element 10e abuts the lip 44 in the border segment of another oppositely oriented electroconductive element 10g adjacent to the other side of the first element. Once welded together, each pair of adjacent elements has a predetermined overall length which equals the length of an individual element plus the longitudinal dimension of the border segment 40. In the illustrated embodiment of the invention, the length of an individual element is approximately 10.14 inches, and the longitudinal dimension of the border segment 40 is approximately 0.52 inch. The centerline (see broken line 47 in FIG. 7) of the seam weld 46 that joins the first segment 33 of element 10f to the second segment 35 of element 10e is spaced apart from the centerline of the seam weld joining the first segment 33 of element 10e to the second segment 35 of element 10g by a predetermined distance.

Figure 7:
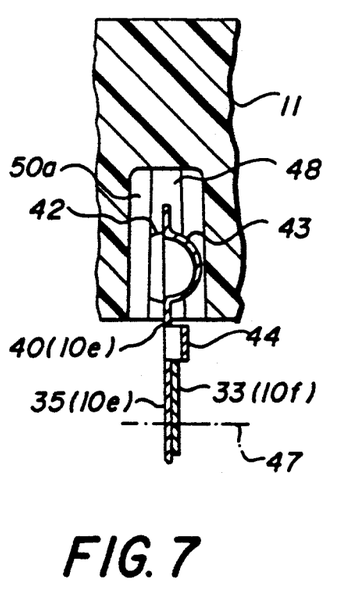
FIG. 7 is an enlarged sectional view of the central area of one of the slotted openings in an insulating support member of the assembly frame, taken through section lines 7—7 of FIG. 2, in which opening there is inserted the border segment of one of the welded plate-like elements constructed in accordance with the present invention.

When a group of welded elements 10 has been installed in the frame of the resistor grid assembly (see FIG. 1) the border segments 40 of alternate elements are respectively received in the slotted openings in a sidewall of one of the insulating support members 11, 12 and 13, and the three bosses 41-43 in the border segment 40 of each element cooperate with the certain enlarged areas in the associated opening to center the border segment therein. As is shown in FIGS. 2 and 7, each slotted opening is characterized by a relatively narrow (e.g., approximately 0.12-inch wide), blind rectilinear slot 48 having a plurality of enlarged areas 50. The slot 48 has a predetermined depth (e.g., 0.5 inch) which is less than the longitudinal dimension of the border segment 40 of each electroconductive element 10. Each of the separate enlarged areas 50 is formed by complementary, concave indentations in the boundaries of the slot 48 on the two sides thereof. Preferably, this is accomplished by providing cylindrical recesses or pockets in the walls bounding each slotted opening at the same time the rectilinear slots 48 are formed during the molding process of the support member. The resulting gap between opposite sides of the slotted opening at each of the areas 50 is more than twice the gauge of the element 10, and it can be as much as ten times greater. In one embodiment of the invention, each enlarged area has a diameter of approximately 0.27 inch. As can be seen in FIG. 2, two of the enlarged areas 50 in each slotted opening are located outboard with respect to the third one. The distance between the centers of these outboard areas is the same as the distance (e.g., two inches) between the centers of the outboard bosses 41 and 42 in the border segment 40 of each element 10. The third enlarged area 50a is located on the longitudinal centerline of the support member halfway between the other two enlarged areas of the same opening. Preferably, the enlarged areas of each slotted opening have the same depth as the slot 48.

Upon installing a group of welded elements 10 in the resistor grid assembly, the outboard bosses 41 and 42 in the border segment 40 of each element will enter the two outboard enlarged areas 50, respectively, of a slotted opening in the associated support member, and the third bosses 43 will enter the central enlarged area 50a of the same opening. FIG. 7 is an enlarged cross-section of one of the slotted openings in the top support member 11 of the assembly, taken along the longitudinal centerline of the member 11 and showing the third boss 43 in the border segment 40 of electroconductive element 10e loosely received in the central enlarged area 50a of such opening. Many advantages of the present invention will be apparent in this figure. The border segment 40 is centered between the sides of the slot 48; appreciable movement to the right of center (as viewed in FIG. 7) is effectively prevented by the relatively small gap between the boundary of the central area 50a on the right side of the slotted opening and the crest of the third boss 43, and appreciable movement to the left of center is effectively prevented by correspondingly small gaps between the boundaries of the outboard enlarged areas 50 on the opposite side of the slotted opening and the crests of the respective bosses 41 and 42 protruding from the other side of the same border segment.

So long as the perpendicular distance from the center plane of the border segment 40 to the crest of each of the three separate bosses 41–43 is maintained substantially constant (e.g., approximately 0.12 inch), the sheet metal stock from which the electroconductive elements 10 are made can have any one of a variety of alternative gauges (e.g., from 0.02 to 0.1 inch thick) without changing the dimensions of the insulating support members and their slotted openings. The outer surface of each of the bosses 41–43 is curved in a direction that will facilitate angular movement of the border segment 40 in the slotted opening if the element 10e were to bend or warp due to a thermal excursion. There are at most only three areas where the border segment 40 touches the sides of the slotted opening. By forming each of the bosses 41–43 in a semi-spherical shape, the size of each of the three contact areas is very small, approaching a point contact which desirably minimizes the transfer of heat by conduction from the element 10e to the insulating support member 11.

The bottom of the slotted opening in the top support member 11 of the resistor grid assembly is separated from the bottom of the corresponding opening in the opposing sidewall of the center support member 12 by a predetermined distance (e.g., 10.8 inches) which preferably is longer by a slight amount (e.g., 0.14 inch) than the overall length of a pair of oppositely oriented elements 10e and 10f that have been joined together by welding. Accordingly, with the distal end of the border segment of the adjacent element 10f touching the bottom of a slotted opening in the center support member 12 (not shown in FIG. 7) the distal end of the border segment 40 of the element 10e is spaced apart from the bottom of the slot 48 in the top member 11 by a gap of virtually the same slight amount. This gap serves two useful purposes. It provides room for the elements 10e and 10f to expand longitudinally, as their temperature rises, without undesirable binding of their border segments 40 in the slotted openings or distortion of their bodies 31. Furthermore, so long as such expansion has not caused the distal end of the border segment 40 of the element 10e to touch the bottom of the slot 48, the air gap inhibits the transfer of heat by conduction from the hot element 10e to the insulating member 11.

Additional advantages of the invention are attributable to the lip 44 in the border segment 40 of each element 10. As is indicated in FIG. 7, the lip 44 in the border segment of the element 10e is so located that its stops the adjacent element 10f in a lengthwise position that ensures that the first, offset segment 33 of the latter element does not enter the slotted opening in the top support member 11. At the opposite end of the element 10e, the distal end of the first, offset segment of this element similarly abuts a lip in the border segment of the next, oppositely oriented element to which it is welded, thereby locating the element 10e in such a lengthwise position that its first segment does not enter a slotted opening in the center support member 12. (Note that the longitudinal dimension of the border segment 40 is not less than the depth of the slotted opening.) Consequently, adjacent elements are supported in the resistor grid assembly solely by their respective border segments 40. This "single ply" support arrangement is advantageous compared to prior art arrangements wherein segments of two adjacent elements are received in each opening. The slot 48 can be thinner and therefore the insulating support member will be stronger. Less heat is conducted to and radiated from the portion of the single element inside the opening. Another advantage, compared to the arrangement disclosed in U.S. Pat. No. 4,654,627, is that the border segments are well positioned for convention cooling. The long dimension of each slot 48 is parallel to the direction of cooling air that is blown through the gaps between adjacent elements 10 of the assembly, and such cooling air has ample spaces to flow between the sides of each slot 48 and the single ply border segment 40 that is centered therein.

The body 31 and the three different segments 33, 35 and 40 of each of the duplicate electroconductive elements 10 are all stamped or cold formed from a unitary strip of sheet metal, preferably stainless steel 406 (commonly referred to as "Alcres"). In the illustrated embodiment, the strip is a 3.1-inch section of sheet metal stock taken from a roll of thin sheet metal that is approximately 10.7 inches wide. The first step in the presently preferred process of manufacturing each element is to punch a pair of guide holes in each of the two transverse margins of such a strip, these holes being spaced apart from one another approximately one inch and being centered with respect to the longitudinal centerline of the strip. The margin at one end of the strip (i.e., the "first" margin) will become the border segment of the finished element; the pair of guide holes that are punched in this margin have been omitted in FIGS. 4, 8 and 9 for the sake of drawing simplicity. The second margin is located at the other end of the strip, and it will be cut off in the last step of the element manufacturing process.

After the guide holes are punched, they are used for properly positioning the strip in a series of different stations where the subsequent steps of the manufacturing process are performed in sequence. The second step of the preferred process is to punch or lance the first margin of the strip to form the lip 44 while also depressing or "dimpling" opposite sides of the same margin to partially coin the respective bosses 41, 42 and 43. At the same time, two relatively small notches 52 and 53 are respectively punched in opposite edges of the first margin of the strip (see FIG. 4). During installation of each group of welded elements in the resistor grid assembly (FIG. 1), the notches 52 and 53 of alternate elements will cooperate with a portable, shim-like tool (not shown) temporarily inserted in the notches to hold the group in a vertically centered position with respect to the associated pair of horizontal insulating support members 11 and 12 (or 12 and 13) as the lead in connector (22 or 24) of the group is welded to the associated one of the vertical metal frame members 15 and 17 of the assembly and as the top and bottom horizontal support members are respectively bolted to these vertical members.

The next step of the element manufacturing process is to press the strip between suitable dies that deform a preselected surface of the strip so as to form the stiffening rib 32 therein. At the same time, the first margin of the strip is further depressed in the regions of the separate bosses 41-43 to complete the formation of these three semi-spherical protuberances. This is followed by a step of cutting, bending and trimming the strip near its second margin to form the aforesaid offset segment 33. In the last step of the process, the strip is severed from the sheet metal roll and its second transverse margin is cut off and removed from the offset segment.

Figure 8:
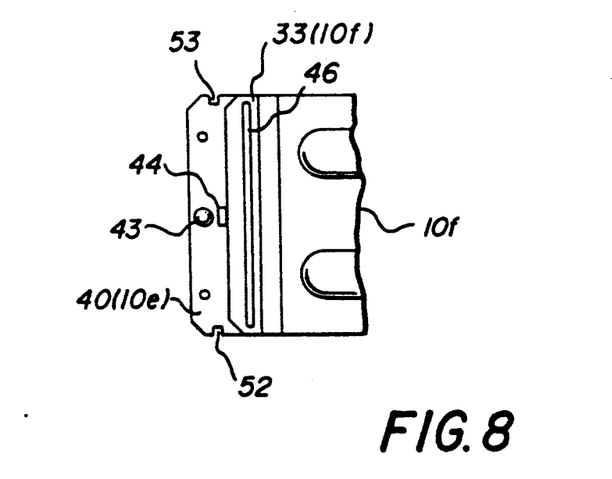
FIGS. 8 and 9 are plan views of opposite sides of the welded ends of a pair of adjacent elements that are bonded together by a seam weld.
Figure 9:
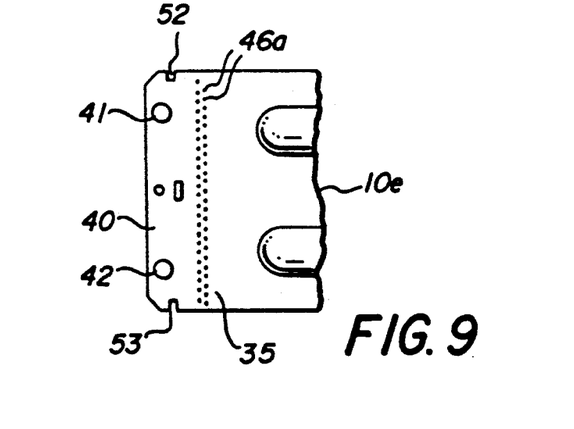

The adjoining surfaces 37 and 39 of each pair of adjacent elements (e.g., elements 10e and 10f) are bonded together by a seam weld 46 that extends transversely across the joined segments of these two elements for at least 75% of their width. At the common boundary of these segments the seam weld 46 is preferably at least 50% wider than each segment is thick. So long as these criteria are observed, the cross-sectional area at the current-conducting interface between adjacent elements will be greater than the cross-sectional area of the body of each element, and consequently in normal operation the grid current passing through the seam weld 46 will not generate untoward heat. In the illustrated embodiment of the invention, this result is obtained by using a laser welder (not shown) which has important advantages (including speed and consistency) compared to other known welders (e.g., resistance welders) that could alternatively be used to make the seam weld 46. In practice, a laser welder of relatively high power (e.g., 9,000 watts) is required to produce a weld nugget of the prescribed width. However, a smaller weld nugget would suffice if the seam weld 46 is characterized by a "zig-zag" joint which can be obtained by a wobble beam laser welding process, also known as laser beam "scanning." Such a seam weld is illustrated in FIGS. 8 and 9 for the pair of adjacent elements 10e and 10f. A 5,000-watt industrial $CO_2$ laser welder was programmed automatically to move the focal point of its laser beam short distances back and forth in directions perpendicular to the centerline of the seam weld as the beam rapidly traverses the width of the adjoining segments 33 and 35 of the respective elements 10f and 10e (or as this pair of elements move in a transverse direction through the laser beam, as the case may be). The zig-zag pattern is apparent in FIG. 9 in which the dots 46a correspond to the respective points where the laser beam dwells momentarily as the direction of deflection reverses. Because its effective cross-sectional area is larger than the cross-sectional area of a straight-line weld produced by the same laser beam, the zig-zag seam weld has several significant advantages. It has higher physical strength, lower electrical resistance, and lower temperature rise when traversed by current of a given magnitude for a given interval of time. Lower temperature rise desirably reduces the amount of heat conducted to the border segment 44 and radiated to the associated insulating support member of the resistor grid assembly. Lower temperature rise also contributes to less oxidation and to less corrosion of the weld bead, thereby desirably increasing the life of the assembly.

While a preferred embodiment of the invention and the preferred manner of making and using it have been described, various other embodiments and modifications will be apparent to persons skilled in the art. The concluding claims are therefore intended to cover all such modifications as fall within the true spirit and scope of the invention.

I claim:

1. A resistor grid assembly comprising:
  a plurality of generally parallel, plate-like, electrically conductive elements, each element having only one off-set end, and being disposed between first and second spaced-apart support members of electrically non-conductive material and aligned, respectively, with a plurality of slotted openings in the opposing sidewalls of the support members, adjacent elements in the assembly being oppositely oriented and the first segment of each element being welded to the second segment of the next element; the plurality of electrically conductive elements each comprising:
  a. a relatively thin, substantially rectangular, plate-like metal body having a predetermined width;
  b. first and second metal segments at opposite ends of the body, each of the segments being integral with and having substantially the same width as said body, the second segment being coplanar with the body;
  c. each element being bent at the juncture of the first segment and the body, to form a first portion generally coplanar with the body and a second portion connecting the first portion with the body, the first segment of each element being adapted to be welded to the surface of the second segment of another element after two such elements are placed side by side with opposite orientation so that the first segment of one adjoins the second segment of the other;
  d. a metal border segment, contiguous and generally coplanar with the second segment and having substantially the same width and gauge as the second segment, for entering a slotted opening in the sidewall of one of the first and second support members of the resistor grid assembly, the border segments of alternate elements in the assembly being respectively receivable by the slotted openings in the first support member, and the border segments of the oppositely oriented elements between said alternate elements being respectively receivable by the slotted openings in the second support member such that adjacent elements are supported by their respective border segments when installed in the assembly; and e. at least one protuberance formed in the border segment, forming a physical stop for locating the distal end of the first segment of the adjacent element in a desired lengthwise position when two such elements are placed side-by-side with opposite orientation such that the second segment of one element can be operatively connected to the adjoining first segment of the other element.

2. The assembly of claim 1, wherein the protuberance in the border segment of each element is located on the longitudinal centerline of the element.

3. The assembly of claim 1, wherein the desired lengthwise position ensures that the first segment of each element will not be positioned a slotted opening in either one of the support members after the elements are installed in the resistor grid assembly thereby reducing the amount of heat received in the slotted openings.

4. The assembly of claim 1, further comprising: stiffening means formed in the body of each element.

5. The assembly of claim 4, wherein the stiffening means further comprises: first and second long, parallel sections extending longitudinally and being interconnected by at least one short transverse section.

6. The assembly of claim 1, further comprising:
at least three additional separate protuberances formed in the border segment of each element, the first and second separate protuberances being outboard with respect to the third separate protuberance and projecting a predetermined distance above the surface of one side of the border segment, and the third protuberance projecting above the surface of the other side of the border segment, the separate protuberances being located so that they will enter one of the slotted openings in the associated support member when the elements are installed in the resistor grid assembly, thereby approximately centering the border segment in the slotted opening.

7. The assembly of claim 6, wherein the third separate protuberance in the border segment of each element is located on the centerline between the first-mentioned protuberance and the distal end of the border segment.

8. The assembly of claim 6, wherein each of the separate protuberances in the border segment of each element is formed by depressing the side of the border segment opposite the protuberance.

9. The assembly of claim 8, wherein the first-mentioned protuberance in the border segment of each element is formed by lancing the border segment.

10. The assembly of claim 6, wherein the outer surface of each of the separate additional protuberances in the border segment of each element is curved in a direction that will facilitate angular movement of the border segment in the slotted opening if the element were to bend due to a thermal excursion.

11. The assembly of claim 10, wherein each of the separate additional protuberances in the border segment of each element is semi-spherically shaped.

12. The assembly of claim 6, wherein a pair of elements disposed side-by-side with opposite orientation and having the first segment of one element of the pair joined to the second segment of the other element of the pair by means of a seam weld extending transversely across the joined segments for at least 75% of the predetermined width.

13. The pair of elements of claim 12, in which said seam weld was obtained by a laser welding process.

14. The pair of elements of claim 12, in which said seam weld is characterized by a "zig-zag" joint which was obtained by a wobble beam laser welding process.

15. A resistor grid assembly comprising:
a plurality of electrically conductive elements made from sheet metal stock having a predetermined gauge and disposed between first and second spaced-apart support members of electrically non-conductive material and being aligned, respectively, with a plurality of slotted openings in the opposing sidewalls of the support members, each slotted opening having at least three areas where the gap between sides of the opening is more than twice the predetermined gauge, each of the electrically conductive elements being offset from a second flat segment near the opposite end of the same element, adjacent elements in the assembly being oppositely oriented, and the first segment of each element being welded to the second segment of the next element, the plurality of electrically conductive elements each comprising:

a. a relatively thin, substantially rectangular, plate-like metal body having a predetermined width;

b. first and second metal segments at opposite ends of the body, each of the segments being integral with and having substantially the same width as the body, the second segment being coplanar with the body;

c. each element being bent at the juncture of the first segment and the body so that the flat surface of the upraised side of the first segment is offset to form a plane generally parallel to and overlying the corresponding side of the second segment, the surface of the first segment of each element being operative for welding to the flat surface of the other side of the second segment of another element after two such elements are placed side by side with opposite orientation so that the first segment of one adjoins the second segment of the other;

d. a metal border segment contiguous and generally coplanar with the second segment, the border segment having substantially the same width and gauge as the second segment for entering a slotted opening in one of the first and second support members of the resistor grid assembly, the border segments of alternate elements in the assembly being respectively receivable by the slotted openings in the first support member, and the border segments of the oppositely oriented elements between the alternate elements being respectively receivable by the slotted openings in the second support member, such that adjacent elements are supported by their respective border segments when installed in the assembly; and e. at least three separate protuberances formed in the border segment, the first and second protuberances being outboard with respect to the third protuberance and projecting a predetermined distance above the surface of one side of the border segment, the third protuberance projecting above the surface of the other side of the border segment, the separate protuberances being so located that they will respectively enter the three areas of the slotted opening in the associated support member when the elements are installed in the resistor grid assembly, thereby centering the border segment between the sides of the slotted opening and reducing the amount of heat transmitted from the border segment to the slotted openings.

16. The assembly of claim 15, wherein the third protuberance in the border segment of each element is located on the longitudinal centerline of the element.

17. The assembly of claim 15, each of the protuberances in the border segment of each element is formed by depressing the side of the border segment opposite such protuberance.

18. The assembly of claim 15, wherein the outer surface of each of the protuberances in the border segment of each element is curved in a direction that will facilitate angular movement of the border segment in the slotted opening if the element were to bend due to a thermal excursion.

19. The assembly of claim 18, wherein each of the protuberances in the border segment of each element is semi-spherically shaped.

20. An electrically conductive element for use in a resistor grid assembly, the element comprising:
a plate-like metal body;
at least two segments, operatively connected to opposing ends of the body, for interconnecting a plurality of the elements together, one segment being approximately coplanar with the body and the other segment being offset from the body and having a connecting portion and an end portion spaced from and approximately parallel to the body;
a border segment, operatively connected to the coplanar segment of the body, for engaging a slotted opening in the side wall of an insulating support member of the resistor grid assembly; and
stop means, operatively formed on the border segment, for positioning another element relative thereto to form part of the resistor grid assembly.

21. The element of claim 20 further comprising:
means, operating connected to the border segment, for minimizing heat transfer from the element to the insulating support members.

22. The element of claim 21 wherein the heat transfer minimizing means further comprises:
at least three protuberances formed in the border segment.

23. The element of claim 21 wherein each protuberance is semi-spherically shaped.

24. The element of claim 22 wherein at least one protuberance is formed proximate each end of the border segment.

25. The element of claim 24 wherein the third protuberance is formed approximately midway between the other two end protuberances.

26. The element of claim 25 wherein the third protuberance projects in a direction opposite to the other two protuberances.

27. An electrically conductive element for use in a resistor grid assembly made by a process comprising the steps of:
providing sheet metal stock having margins;
punching a pair of guide holes in each of the two transverse margins of a strip of the stock;
forming means for positioning another element relative thereto for use in forming the resistor grid assembly;
forming at least two notches for holding an assembled group of elements in a vertically centered position relative to an associated pair of horizontal insulating support members as a lead-in connector of the group is welded to the associated one of the vertical metal frame members to an associated one of vertical metal frame members of the assembly and as the top and bottom horizontal support members are respectively bolted to these vertical members;
forming stiffening means in each element;
forming at least three protuberances in one end of each element;
forming an off-set in the end of the strip opposite the protuberances, the off-set comprising two portions, one portion being coplanar with the element and the second portion connecting the first portion to the element;
forming a positioning means in the end of the element having the three protuberances; and
severing the element from the strip of stock.

28. The element of claim 27 wherein the stiffening means is formed in an H configuration.

29. A method for bonding adjoining surfaces of a pair of adjacent electrically conductive elements for use in a resistive grid assembly, each element comprising:
a plate-like metal body;
at least two segments, operatively connected to opposing ends of the body, for interconnecting plurality of the elements together, one segment being approximately coplanar with the body and the other segment being offset from the body and having a connecting portion and an end portion spaced from and approximately parallel to the body;
a border segment, operatively connected to the coplanar segment of the body, for engaging a slotted opening in the side wall of an insulating support member of the resistor grid assembly; and
means, operatively positioned on the border segment, for properly positioning another element relative thereto to form part of the resistor grid assembly;
the method comprising the steps of:
positioning at least two electrically conductive elements together with opposite orientation so that the second segment of one adjoins the first segment of the other; and
welding the adjacent segments so that a resulting joint reduces the amount of heat conducted and radiated by the border segment to any associated insulating support means for the resistor grid assembly.

30. The method of claim 29 wherein a laser welder having a focal point is utilized in the welding step.

31. The method of claim 30 wherein the laser welder has relatively high power of approximately at least 9,000 watts.

32. The method of claim 30 wherein the laser welder has relatively low power of approximately 5,000 watts and utilizes a wobble beam laser welding process to form the joint.

33. The method of claim 32 wherein the welding step further comprises:
programming a 5,000 watt $CO_2$ laser welder to traverse the focal point of the laser beam successively short distances back and forth in a direction perpendicular to the centerline of the seam weld to form a zig-zag pattern weld.

* * * * *